United States Patent
Peden et al.

(10) Patent No.: US 8,625,760 B1
(45) Date of Patent: Jan. 7, 2014

(54) PROVIDING ALTERNATE CALLER NAMES IN ACCORDANCE WITH CALLER-NAME PREFERENCES

(75) Inventors: Mark Douglas Peden, Olathe, KS (US); Gary Duane Koller, Overland Park, KS (US); Raymond Emilio Reeves, Olathe, KS (US); Simon Youngs, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 1 day.

(21) Appl. No.: 13/348,284

(22) Filed: Jan. 11, 2012

(51) Int. Cl.
*H04M 1/56* (2006.01)
*H04M 15/06* (2006.01)

(52) U.S. Cl.
USPC ............. 379/142.04; 379/142.01; 379/201.11

(58) Field of Classification Search
USPC ............. 379/142.01, 142.04, 201.02, 201.11; 455/415
See application file for complete search history.

(56) References Cited

U.S. PATENT DOCUMENTS

| | | | |
|---|---|---|---|
| 2002/0067816 A1* | 6/2002 | Bushnell | 379/201.02 |
| 2005/0031106 A1* | 2/2005 | Henderson | 379/142.17 |
| 2006/0026277 A1* | 2/2006 | Sutcliffe | 709/224 |
| 2007/0127656 A1* | 6/2007 | Citron et al. | 379/142.01 |
| 2008/0112552 A1* | 5/2008 | Urban et al. | 379/142.04 |
| 2009/0225967 A1* | 9/2009 | Koch | 379/142.06 |
| 2009/0310765 A1* | 12/2009 | Denny et al. | 379/142.15 |

* cited by examiner

*Primary Examiner* — Quoc D Tran

(57) ABSTRACT

Systems, methods, and computer-readable media for providing alternate caller names in accordance with caller-name preferences are provided. In one embodiment, a device identifier associated with a phone call initiated by a calling device is received. A caller-name preference(s) associated with the calling device is referenced. The caller-name preference(s) can indicate usage of a first caller name and/or a second caller name. The caller-name preference(s) can be used to select one of the first caller name or the second caller name to provide to in association with the phone call initiated by the calling device.

20 Claims, 4 Drawing Sheets

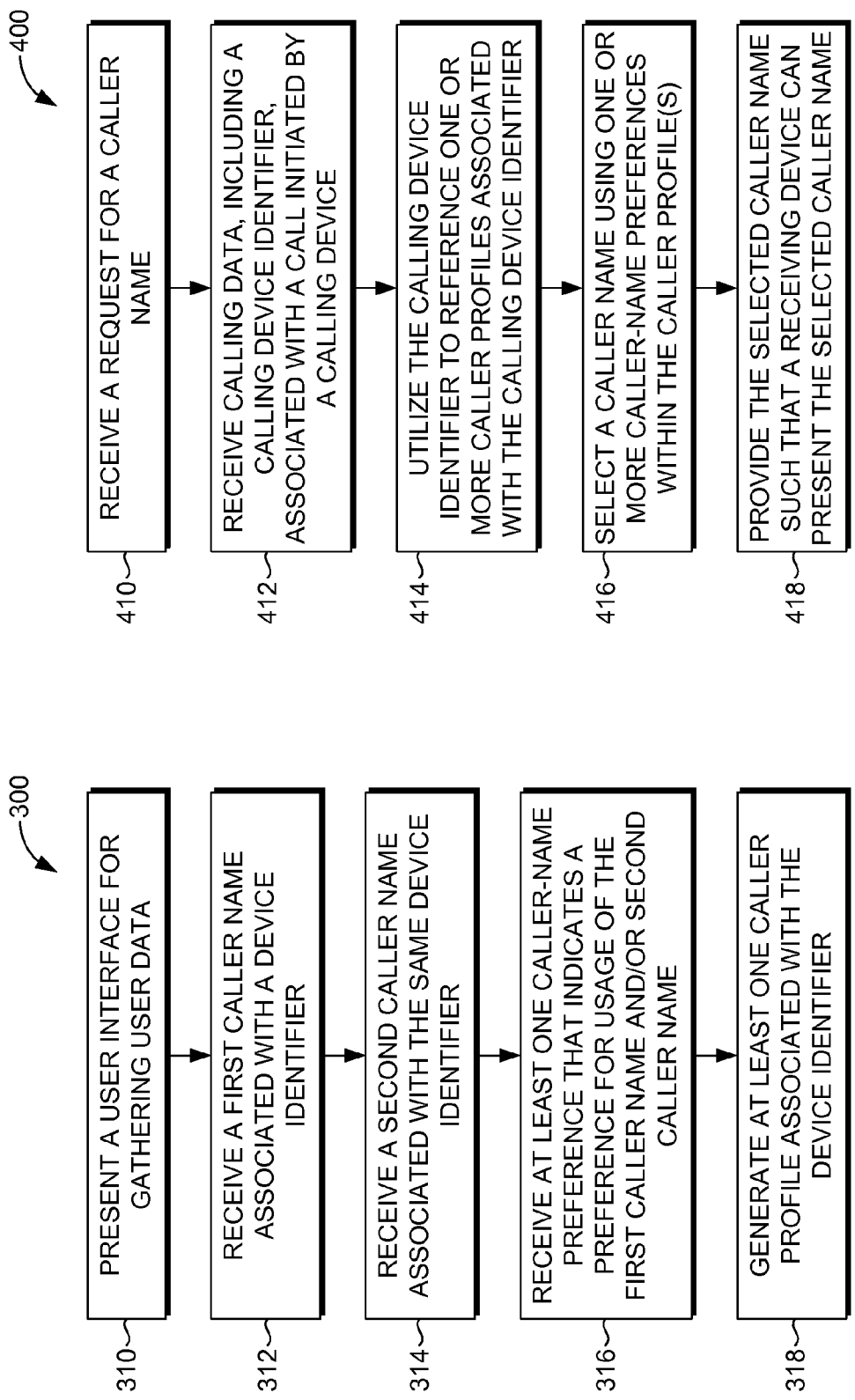

PROVIDING ALTERNATE CALLER NAMES IN ACCORDANCE WITH CALLER-NAME PREFERENCES

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

In embodiments, one or more computer-readable media having computer-executable instructions embodied thereon that, when executed, perform a method for providing alternate caller names in accordance with caller-name preferences are provided. The method includes receiving a first caller name associated with a device identifier for a calling device and receiving a second caller name associated with the device identifier for the calling device. At least one caller preference that indicates a preference of usage for at least one of the first caller name and the second caller name is also received. Thereafter, at least one caller profile associated with the device identifier is generated. The caller profile(s) includes the first caller name, the second caller name, and the at least one caller preference The caller profile(s) is used to identify which of the first caller name or the second caller name to provide to in association with a call initiated by the calling device.

In other embodiments, one or more computer-readable media having computer-executable instructions embodied thereon that, when executed, perform a method for providing alternate caller names in accordance with caller-name preferences are provided. A device identifier associated with a phone call initiated by a calling device is received. Thereafter, a caller-name preference(s) associated with the calling device is referenced. The caller-name preference(s) can indicate usage of a first caller name and/or a second caller name. The caller-name preference(s) can be used to select one of the first caller name or the second caller name to provide to in association with the phone call initiated by the calling device.

In still further embodiments, a method for providing alternate caller names in accordance with caller-name preferences is provided. The method includes receiving and presenting a first caller name in association with a first call initiated by a calling device associated with a phone number. In association with a second call initiated at a different time by the calling device associated with the same phone number, a second caller name that is different from the first caller name is received and presented. The first caller name and the second caller name are selected based on caller-name preferences indicating a preference of usage for the first caller name and the second caller name.

BRIEF DESCRIPTION OF THE SEVERAL VIEWS OF THE DRAWINGS

Illustrative embodiments of the present invention are described in detail below with reference to the attached drawing figures, and wherein:

FIG. 3 illustrates a first method, according to an embodiment of the present invention, for providing alternate caller names;

FIG. 4 illustrates a second method, according to an embodiment of the present invention, for providing alternate caller names.

DETAILED DESCRIPTION

Figure 1:
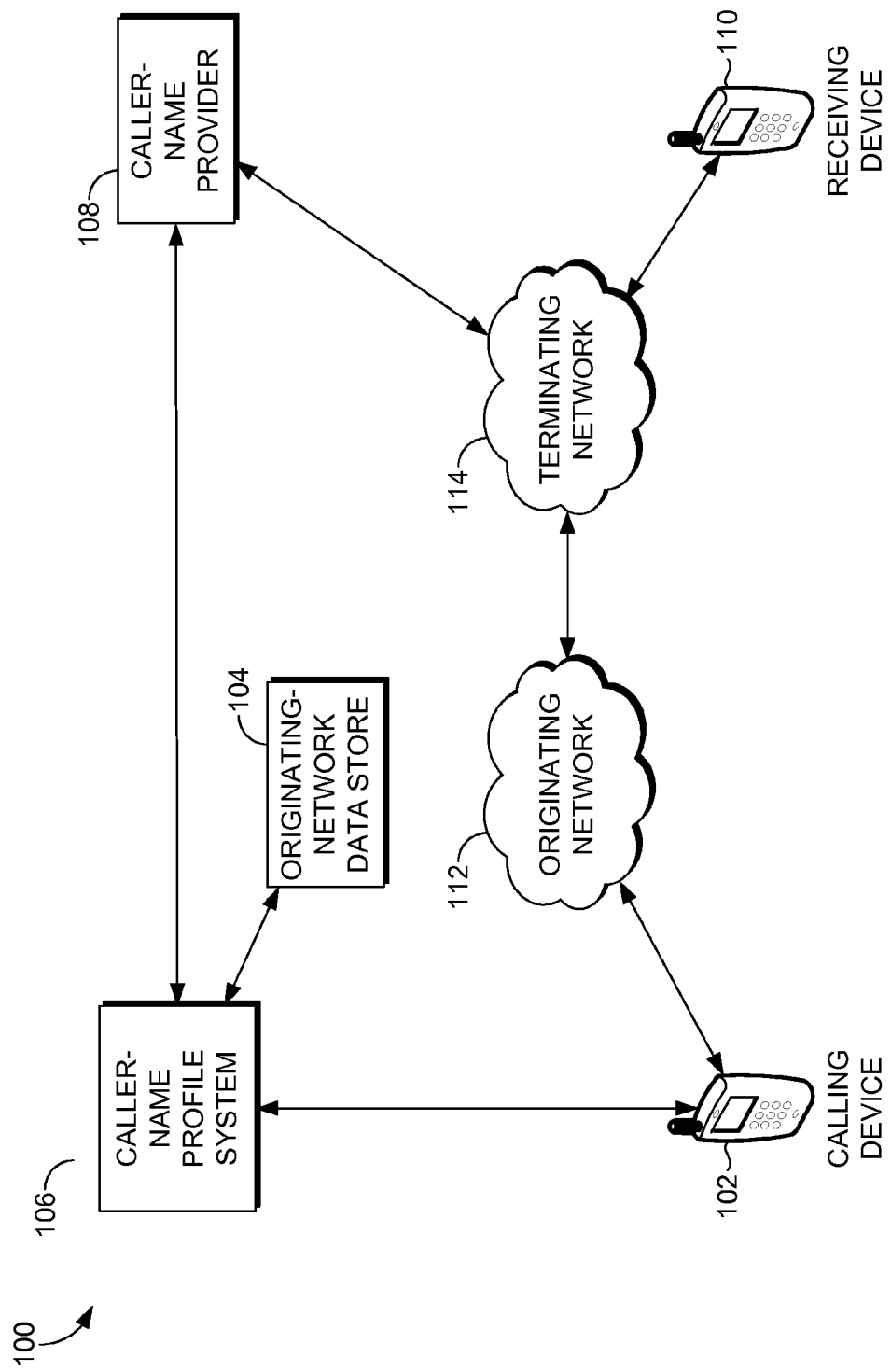
FIG. 1 is a block diagram of an exemplary networking system for providing alternate caller names, in accordance with an embodiment of the present invention.

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| 3G | Third-Generation Wireless Telephone Technology |
| 4G | Fourth-Generation Wireless Telephone Technology |
| CDMA | Code Division Multiple Access |
| CD-ROM | Compact Disk Read Only Memory |
| DVD | Digital Versatile Discs |
| EEPROM | Electrically Erasable Programmable Read Only Memory |
| GPRS | General Packet Radio Service |
| GSM | Global System for Mobile Communications |
| iDEN | Integrated Digital Enhanced Network |
| IP | Internet Protocol |
| ISP | Internet Service Provider |
| PC | Personal Computer |
| PCS | Personal Communications Service |
| PDA | Personal Digital Assistant |
| RAM | Random Access Memory |
| ROM | Read Only Memory |
| TDMA | Time Division Multiple Access |
| UMTS | Universal Mobile Telecommunications System |
| WiMAX | Worldwide Interoperability for Microwave Access |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the present invention relate to systems, methods, and computer-readable media for providing alternate caller names in accordance with caller-name preferences. A caller name, as used herein, refers to a value or identifier associated with a calling device identifier. Generally, a caller name includes a character string, including alphabetical characters, that identifies a particular user, set of users, or entity associated with a calling device. In some cases, a caller name may additionally or alternatively include numeric characters, symbols, or other characters that can indicate a calling user(s) or entity (e.g., business, company, organization, etc.) associated with a calling device. In this regard, a caller name generally indicates the caller (e.g., user, entity, or set of users such as a family) placing the phone call, or device associated therewith, and is displayed to a receiving device that receives the phone call. Examples of a caller name include "John P. Doe," "John" "The Doe Family," "ABC Corp.," etc. A call or phone call, as used herein, refers to a communication between two or more parties using one or more networks, such as a wireless telecommunications network.

A device identifier with which a caller name is associated can be any identifier that identifies a device that is capable of placing calls or a telephone line. As can be appreciated, in some cases, a device identifier is associated with multiple devices. For example, a plurality of phones within a home or business can each be associated with the same phone number. In embodiments, a device identifier is a telephone number or phone number. In other embodiments, a device identifier might be an IP address or other identifier that is used to call from a calling device(s) to a receiving device(s). Although a device identifier is generally a sequence of numerical values, embodiments of the present invention are not limited to a sequence of numerical values.

In operation, a calling device is utilized to dial a device identifier, such as a phone number, associated with a receiving device to initiate a telephone call. In some cases, the receiving device can present the device identifier associated with the calling device and/or a caller name associated with the device identifier. The caller name can provide an indication of the calling device or the caller (e.g., user or entity). The device identifier and/or caller name can be presented to the receiving device, for example, via a caller ID, as discussed more fully below.

According to embodiments of the present invention, a device identifier can be associated with a plurality of caller names. In this regard, a first caller name associated with a device identifier can be displayed to a receiving device in a first instance, and a second caller name associated with the same device identifier can be displayed to the receiving device in a second instance. Having alternate caller names associated with a single device identifier (e.g., phone number) allows a user of a user device to be identified or recognized in one manner in some circumstances while be identified or recognized in another manner in other circumstances. In this way, rather than allocating a static caller name with a device identifier, a user can leverage a single device identifier for multiple purposes using multiple caller names (e.g., a personal caller name and a business caller name).

In implementation, a set of one or more caller-name preferences is utilized to identify which of a plurality of caller names associated with a device identifier to provide to a receiving device. The caller-name preferences may include any number of preferences that indicate a specific caller name to utilize in association with a call placed from a calling device. As discussed more fully below, attributes such as a time of day of a call, a day of week of a call, a location of calling device, an originating country, and the like can be utilized to determine or select which caller name to provide to the receiving device for displaying to the user of the receiving device.

Having briefly described an overview of embodiments of the present invention, an exemplary operating environment in which embodiments of the present invention may be implemented is described below in order to provide a general context for various aspects of the present invention. In particular, an exemplary operating environment for implementing embodiments of the present invention could be generally referred to as a computing device. The invention may be practiced in a variety of computing device configurations, including handheld devices, consumer electronics, general-purpose computers, mobile computing devices, wireless computing devices, mobile phones, and more specialty computing devices. The invention may also be practiced in distributed computing environments where tasks are performed by remote-processing devices that are linked through a communications network.

Devices or computing devices can include a number of components, such as memory, one or more processors, one or more presentation components, input/output (I/O) ports, I/O components, and one or more networking interfaces. Computing devices can include a variety of computer-readable media. Computer-readable media can be any available media that can be accessed by a computing device and include both volatile and nonvolatile media, removable and nonremovable media.

Referring to the drawings generally, and initially to FIG. 1 in particular, an exemplary network environment 100 for practicing an embodiment of the present invention is provided. It will be understood and appreciated by those of ordinary skill in the art that the network environment 100 shown in FIG. 1 is merely an example of one suitable network environment and is not intended to suggest any limitation as to the scope of use or functionality of the present invention. Neither should the network environment 100 be interpreted as having any dependency or requirement related to any single component or combination of components illustrated therein. The single unit depictions are meant for clarity, not to limit the scope of embodiments in any form.

As shown in FIG. 1, an exemplary network environment 100 includes a calling device 102, an originating-network data store 104, a caller-name profile system 106, a caller-name provider 108, and a receiving device 110. The calling device 102, the originating-network data store 104, the caller-name profile system 106, the caller-name provider 108, and/or the receiving device 110 are capable of communicating via a communications network(s), such as originating network 112 and/or terminating network 114. Network 112 and/or network 114 might comprise, for example, a cable network, the Internet, a wireless network (e.g., a wireless telecommunications network), a wireline network, a local exchange carrier (LEC), or a combination thereof or portions thereof. A wireless telecommunications network refers to any type of telecommunications network that is wireless. Examples of a wireless telecommunications technologies that are compatible with the networks 118 and/or 120 include, but are not limited to, Global System for Mobile Communications (GSM), General Packet Radio Service (GPRS), Code Division Multiple Access (CDMA), CDMA2000, CDMAOne, Time Division Multiple Access (TDMA), Universal Mobile Telecommunications Systems (UMTS), Integrated Digital Enhanced Network (iDEN), WiMAX, 3G, 4G, and Personal Communications Service (PCS).

In embodiments, network 112 and/or network 114 include an array of devices, which are not shown so as to not obscure more relevant aspects of the invention. Components such as a base station, a communications tower, or even access points (as well as other components) can provide wireless connectivity in some embodiments. Communications network 112 and network 114 may be combined into a single network or can include multiple networks, as well as being a network of networks, but is shown in more simple form so as to not obscure other aspects of the present invention. In this regard, although FIG. 1 illustrates calling device 102 and receiving device 110 communicating with one another via the originating network 112 and the terminating network 114, any number of networks can be used (e.g., a single network, a plurality of networks, etc.).

The originating network 112 and the terminating network 114 enable communication between the calling device 102 and the receiving device 110. The originating network 112, as used herein, refers to a network utilized by the calling device 102 to place a call. In one embodiment, the originating network 112 comprises a wireless telecommunications network provided by a telecommunications network provider, such as, for example, Sprint®, AT&T®, etc. A telecommunications network provider, also known as a carrier, a wireless service provider, a wireless carrier, etc. is a company that provides services for mobile phone users or subscribers. In another embodiment, originating network 112 comprises the Internet. In such a case, a calling device, such as a landline computing device, can communicate via an ISP (Internet Service Provider) associated with the Internet. In yet another embodiment, originating network 112 comprises a physically wired network, such as a landline, Ethernet, or the like. For example, the calling device 102 can utilize a public switched telephone network (PSTN) to place a phone call to the receiving device 110.

Terminating network 114, as used herein, refers to a network utilized by the receiving device 110 to receive a call. In one embodiment, terminating network 114 comprises a physically wired network, such as a landline, Ethernet, or the like. For example, the receiving device 110 can utilize a public switched telephone network (PSTN) to receive a phone call from the calling device 102. In another embodiment, the terminating network 114 comprises a wireless telecommunications network provided by a telecommunications network provider, such as, for example, Sprint®, AT&T®, etc. In yet another embodiment, terminating network 114 comprises the Internet. In such a case, a receiving device, such as a landline computing device, can communicate via an ISP (Internet Service Provider) associated with the Internet. In embodiments, originating network 112 and terminating network 114 can be provided by the same telecommunications network provider or different telecommunications network providers. Although single components are illustrated for clarity, networks 112 and/or 114 can enable communication between multiple devices, components, and/or servers.

Initially, a user or subscriber account is initiated. In this regard, the originating-network data store 104 stores user data associated with users or subscribers of the originating network 112. Accordingly, data associated the calling device 102 or caller(s) associated therewith can be obtained and stored at the originating-network data store 104. Initially, the user data obtained at the originating-network data store 104 may include a name of a user or subscriber, a device identifier associated with a user, entity, line, or device, and any other information associated with a user or subscriber such as a user's phone plan, a user's address, a user's billing method, etc. Such data might be obtained, for example, at a point of sale at which the user registers or subscribes to a telephone service provided by a telecommunications network provider. In some cases, an initial caller name and/or alternative caller names is selected or generated at the point-of-sale and, thereafter, captured at the originating-network data store 104. For instance, such information might be input into a computing device (not shown) by a representative of the telecommunications network provider and provided to the originating-network data store 104. In another example, such information might be provided to the originating-network data store 104 via the calling device 102 initiating registration with the originating network.

As embodiments of the present invention include multiple caller names associated with a device identifier, the caller-name profile system 106 is configured to facilitate establishing a set of one or more caller profiles associated with a device identifier. In this regard, a set of caller profiles can be generated for a caller, calling device, or calling line. In one embodiment, a caller profile is established for each caller name desired or designated by a user. As such, a user can establish multiple caller profiles each being associated with a specific caller name. For example, a first caller profile for a first caller name associated with a calling device identifier can be established, and a second caller profile for a second caller name associated with the calling device identifier can be established. In another embodiment, a single caller profile can be established for a user that includes multiple caller names desired or designated within. For instance, a caller profile associated with a device identifier can include a first caller name and a second caller name. A caller profile may include any information associated with a user or set of users, such as a device identifier, a caller name(s), a caller-name type(s), and a set of one or more caller-name preferences.

As previously mentioned, a device identifier is any identifier that identifies a device, or set of devices, that is capable of placing calls or that identifies a telephone line. Such a device identifier can be used to identify which caller profile(s) to utilize to determine or select a caller name. A caller name, as previously mentioned, refers to a name or value that is provided to a receiving device to indicate a source of a call (e.g., a user or entity associated with a device identifier). A caller-name type indicates or identifies a type or designation of a caller name. For example, a caller-name type might be a "business" type indicating that a caller name is generally to be used for business calls, a "personal" type indicating that a caller name is generally to be used for personal calls, an "education" type indicating that a caller name is generally to be used in accordance with education calls, etc.

A caller-name preference indicates a preference for usage of a specific caller name. Accordingly, a caller profile can include a set of caller-name preferences indicating when a particular caller name should be utilized. For example, assume that a caller profile is established in association with each caller name. In such a case, a first caller profile associated with a first caller name for a user may include a first set of caller-name preferences that indicate when the first caller name should be presented, while a second caller profile associated with a second caller name for the same user may include a second set of caller-name preferences that indicate when the second caller name should be presented. In another example, assume that a caller profile is established in association with a device identifier that includes multiple caller names. In such a case, a caller profile can include a first and second caller name as well as corresponding caller-name preferences.

By way of example only, and not limitation, a caller-name preference may include a time of day setting indicating a time or range of times for usage of a particular caller name, a day of week setting indicating a day or range of days for usage of a particular caller name, a week of month setting indicating a week or range of weeks for usage of a particular caller name, a calling-device location setting indicating a location of a calling device for a particular caller name, an NPA/NXX setting indicating a NPA/NXX indicating a receiving device for usage of a particular caller name, a receiving-device identifier setting for indicating a receiving device for usage of a particular caller name, a holiday setting indicating a holiday (s) for usage of a particular caller name, an originating country setting for indicating an originating country of a call for usage of a particular caller name, and the like.

The caller-name profile system 106 is used to obtain information that can be contained within a caller profile or set of caller profiles. The caller-name profile system 106 can be any computing device, a set of computing devices such as a server or network of servers, or a portion of a computing device. For example, the caller-name profile system 106 might be a server that can provide a graphical user interface with which a user can interact and provide information associated with a device identifier (e.g., a caller-name type(s), a caller name(s), a set of caller-name preferences, etc.). Such a caller-name profile system 106 can receive user data and store such data and/or distribute the user data or caller profile as appropriate.

In embodiments, the caller-name profile system 106 can be accessed by a subscriber or representative of a telecommunications network via a computing device, such as the calling device 102 or other device. For example, a user may utilize a web browser or application to input caller names and/or caller-name preferences. Although the caller-name profile system 106 is illustrated remote from the calling device 102, as can be appreciated, in some embodiments, the caller-name profile system 106 can be integrated with or embedded in the calling device 102, such as an application configured to run on the calling device 102.

In some cases, the caller-name profile system 106 generates caller profiles and communicates such profiles, for example, to the caller-name provider 108. In other cases, the caller-name profile system 106 gathers or obtains user data and provides the user data to another component, such as the caller-name provider 108 to generate any caller profiles utilizing the user data.

In embodiments, the user data and/or caller profile(s) can be communicated to the originating-network data store 104 and/or the caller-name provider 108. As previously discussed, the originating-network data store 104 stores data associated with the user. In this regard, upon receiving caller profiles, or data associated therewith, the originating-network data store 104 can generate and/or store the caller profiles. For example, the caller profiles can be stored in association with a user identifier that identifies a user or subscriber (e.g., an account number, a user name, etc.) or a device identifier that identifies the calling device or line, such as a telephone number.

The caller-name provider 108 is configured to provide caller names. In this regard, in response to receiving a request for a caller name associated with a device identifier, the caller-name provider 108 identifies or references and provides an appropriate caller name. The caller-name provider 108 can be any computing device or set of computing devices capable of providing caller names. In one embodiment, the caller-name provider 108 is a third party to the network provider of the originating network 112 and/or terminating network 114.

Upon receiving caller profiles, or data associated therewith, the caller-name provider 108 can generate and/or store the caller profiles. For example, the caller profiles can be stored in association with a user identifier or device identifier. Accordingly, the caller-name provider 108 can employ a lookup system or utilize an algorithm(s) to identify an appropriate caller name that corresponds with a device identifier associated with a calling device, such as calling device 102.

Upon initial setup of one or more caller profiles associated with a user or device identifier, caller-name preferences can be automatically accessed and utilized (i.e., without user intervention) to identify which caller name to provide to a receiving device to indicate or identify the source of the call (e.g., caller or calling device). In operation, the calling device 102 initiates a phone call via the originating network 112. The calling device 102 can be any device capable of initiating a phone call. As such, the calling device 102 may take on a variety of forms, such as a personal computer (PC), a laptop computer, a tablet, a Smartphone, a mobile phone, a personal digital assistant (PDA), landline telephone, or any other device that is capable of initiating a phone call as described herein. Makers of illustrative devices include, for example, Research in Motion, Creative Technologies Corp., Samsung, Apple Computer, and the like. A calling device can include, for example, a display(s), a power source(s) (e.g., a battery), a data store(s), a speaker(s), memory, a buffer(s), and the like. In embodiments, a calling device comprises a wireless or mobile calling device with which a wireless telecommunications network is utilized for communication. In other embodiments, a calling device comprises a mobile or stationary calling device (e.g., a landline laptop) with which a network, such as the Internet and/or landline, is utilized for communication.

In initiating a phone call, the calling device 102 may communicate calling data associated with the initiated call. Calling data refers to any data that indicates, describes or is associated with the initiated call. By way of example, and without limitation, calling data may include a device identifier, a call time, a call date, a device location, an originating country, a receiving-device identifier (e.g., a phone number associated with a receiving device, an NPA-XXX associated with a receiving device), etc.

Such calling data can be transferred to the terminating network 114 associated with the receiving device 110. In some cases, the terminating network 114 may be configured to obtain, reference, or generate calling data to be used by the caller-name provider. In response, the terminating network 114 can provide the calling data to the caller-name provider 108 along with a request for a caller name. Additionally or alternatively, in some cases, the caller-name provider can obtain, reference, or generate calling data associated with a call to utilize in selecting an appropriate caller name. In such cases, the terminating network 114 can request a caller name from the caller-name provider 108, and the caller-name provider 108 can determine or identify calling data. For example, the time at which the caller-name provider 108 receives the request for a caller name can be used as the time of the call.

As previously mentioned, the caller-name provider 108 is configured to provide an appropriate caller name corresponding with the device identifier. In this regard, the caller-name provider 108 utilizes the calling data in association with one or more caller profiles associated with the device identifier of the call to determine, identify, or select an appropriate caller name. In embodiments, the caller-name provider 108 can utilize a calling device identifier (e.g., received from the terminating network 114) to identify one or more caller profiles associated with the device identifiers. Thereafter, calling data associated with a call being initiated can be used in accordance with the caller-name preferences to determine which of the caller names to provide. For instance, a portion of a calling data might correspond with a caller-name preference indicating a range of values for which to use a particular caller name.

By way of example only, the caller-name provider 108 may recognize a time a call was initiated and select a caller name associated with a time preference that indicates a time or a range of time that corresponds with the time of the call. Similarly, the caller-name provider 108 may recognize a day a call was initiated and select a caller name associated with a day preference that indicates usage of the particular caller name when the call is placed on a particular day or range of days. As another example, the caller-name provider 108 may recognize a receiving-device identifier that identifies the receiving device and determine a caller name that corresponds with the receiving-device identifier.

As can be appreciated, in some cases, various caller-name preferences may be in conflict with one another specific to particular calling data. For example, assume that caller name 1 is preferred for calls placed between 8 a.m. and 5 p.m., and caller name 2 is preferred for calls placed on Saturdays and Sundays. Now assume that a call is initiated at 10:00 AM on a Saturday. In such a case, the caller-name provider 108 may resolve the conflict using priorities of caller-name preferences. For example, a day of the week preference may be a priority over a time of day preference. In such a case, the caller-name provider 108 can identify caller name 2 as the appropriate caller name to provide using priorities of the preferences. Such priorities can be default settings or based on input by a user or representative of a service provider.

In some embodiments, the caller-name provider 108 may include or communicate with distributed devices or databases (not shown). Such distributed devices can be utilized to identify an appropriate caller name that corresponds with a device identifier. For example, an initial caller-name provider might not be capable to run such algorithms or perform such lookups to determine an appropriate caller name. Because selecting an appropriate caller name in accordance with caller-name preferences and calling data can require more processing than simply identifying a static caller name associated with a device identifier, distributed devices or databases might be used to facilitate more efficient identification of caller names corresponding with an instant call. In this regard, the caller-name provider 108 can communicate with one or more distributed devices that can perform caller name identification. In such a case, the caller-name provider 108 can be configured to identify, determine, or designate a particular distributed device to identify a caller name for an instant call.

Upon identifying an appropriate caller name, the caller-name provider 108 provides the caller name selected for the instant phone call to the terminating network 114 for communication to the receiving device 110. The receiving device 110 is a device to which a call is placed. As used herein, the phrase "receiving device" refers to any electronic device capable of receiving calls. As such, receiving device 110 may take on a variety of forms, such as a personal computer (PC), a laptop computer, a mobile phone, a personal digital assistant (PDA), or any other device that is capable of receiving calls as described herein. Makers of illustrative devices include, for example, Research in Motion, Creative Technologies Corp., Samsung, Apple Computer, and the like. A receiving device can include, for example, a display(s), a power source(s) (e.g., a battery), a data store(s), a speaker(s), memory, a buffer(s), and the like. In embodiments, a receiving device comprises a wireless or mobile destination device with which a mobile data network is utilized for communication. In other embodiments, a receiving device comprises a mobile or stationary device with which a network, such as the Internet or landline is utilized for communication.

The receiving device 110 receives the selected caller name and can display the caller name to the user of the receiving device 110. In some embodiments, the caller name is provided and/or displayed when the call is being set up but prior to the user of the receiving device 110 answering the call. In other embodiments, the caller name is provided and/or displayed during the duration of the call. The caller name can be made available to the user of the receiving device 110. In this regard, the caller name can be displayed on the receiving device 110 display or on a separate device associated with the receiving device 110. The caller name can be displayed in conjunction with a device identifier (e.g., a phone number) or independent therefrom.

Figure 2B:
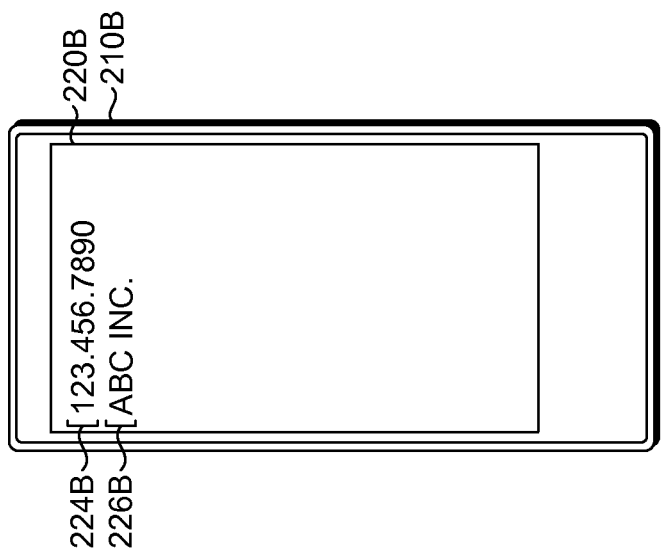
FIG. 2 depicts an illustrative of utilizing different caller names in association with a device identifier, in accordance with an embodiment of the present invention.
Figure 2A:
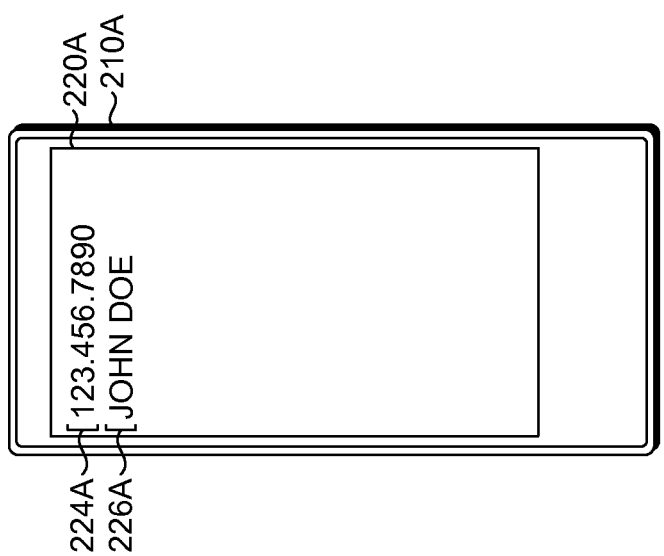

By way of example only, and with reference to FIGS. 2A and 2B, FIGS. 2A and 2B illustrate an example of utilizing different caller names in association with a device identifier. Assume that a caller profile(s) associated with a specific phone number indicates that a call placed between 5:00 p.m. in the evening to 8:00 a.m. in the morning should be associated with the caller name "John Doe" and that a call placed between 8:00 a.m. in the morning and 5:00 p.m. in the evening should be associated with the caller name "ABC Inc." Further assume that a user of a calling device associated with the device identifier initiates a phone call to the receiving device 210A at 8:00 p.m. in the evening. In such a case, the caller name "John Doe" is selected for display and provided to the receiving device 210A. The receiving device 210A indicates the caller by displaying a device identifier 224A associated with the calling device and the selected caller name "John Doe" 226A within a display portion 220A of the receiving device 210A.

With reference to FIG. 2B, now assume that a user of a calling device associated with the same device identifier initiates a phone call to the receiving device 210B at 10:00 a.m. in the morning. In such a case, the caller name "ABC Inc." is selected for display and provided to the receiving device 210B. The receiving device 210B indicates the caller by displaying a device identifier 224B and the selected caller name "ABC Inc." 226B within a display portion 220B of the receiving device 210B. As illustrated, different caller names (i.e., 226A and 226B) associated with the same calling-device identifier are provided to a receiving device based on caller-name preferences associated with the calling-device identifier.

There are many other use cases that can be provided by implementation of embodiments of the invention. For example, assume a sales manager supports multiple brands within separate territories and establishes different caller names based on the NPA-NXX of the dialed party. In such a case, the company name shown to a receiving device as the caller name will change based on the area being dialed. As another example, assume that a supervisor at a manufacturing plant establishes two caller names: a caller name that displays the company name and department when the specific user is on the company premises; and another caller name that displays the individual name when the user is not on the company premises. In this case, as hours worked by the employee may change, linking the preferences or rules to the location would more likely result in providing an appropriate caller name. In yet another example, assume that a student establishes two caller names. A first caller name displays the full name of the user when the user calls a professor or a potential employer during school hours. A second caller name displays only the first name of the user during non-school hours.

Turning now to FIGS. 3-6, exemplary methods for implementing embodiments of the present invention are provided. These exemplary methods can be described in the general context of computer executable instructions. Generally, computer executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network or a communication cloud. In a distributed computing environment, computer executable instructions may be located both in local and remote computer storage media, including memory storage devices.

The exemplary methods are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the methods, or alternate methods. Additionally, individual operations may be omitted from the methods without departing from the spirit and scope of the subject matter described herein. In the context of software, the blocks represent computer instructions that, when executed by one or more processors, perform the recited operations.

FIG. 3 illustrates an exemplary method 300 for providing alternate caller names in accordance with caller-name preferences and is generally depicted by numeral 300. More specifically, the method 300 is one example of implementation for caller profiles to use to select caller names. The method 300 is described in the context of the example caller-name profile system 106 of FIG. 1 for ease of illustration, but is not limited to being performed in such a context (e.g., such a method might be performed by the calling device 102 or the caller-name provider 108 of FIG. 1). As can be appreciated, such a caller-name profile system can be associated with an originating network and may be a component within the originating network, accessible via the Internet, and/or embedded in a calling device (e.g., as an application).

Initially, at block 310, a user interface for gathering user data is presented. In this regard, a user interface allows a user or representative associated with a network provider to input data, such as alternate caller names. In some cases, the user interface might be an electronic form that can be filled in by a user (e.g., receiving text, selection of options, etc.).

At block 312, a first caller name associated with a device identifier is received. For example, a first caller name associated with a device identifier, such as a phone number, IP address, or user account number, is received via a web-enabled form or application form. At block 314, a second caller name associated with the same device identifier is received. At block 316, at least one caller-name preference that indicates a preference for usage of at least one of the first caller name or the second caller name is received. In embodiments, the caller-name preference(s) may indicate when a particular caller name should be utilized based on, for instance, a time of day of a call, a day of week of a call, a week of a call, a month of a call, an intended receiving device or receiver of the call, a holiday on the day of the call, a location of the calling device at the time of the call, an originating country for the call, or the like. In this regard, a caller-name preference(s) may indicate to utilize the first caller name when the call is placed during a first range of times and/or days and/or to utilize the second caller name when the call is placed during a second range of times and/or days. As can be appreciated, a caller-name preference may include exceptions. For instance, calls placed between 8:00 a.m. and 5:00 p.m. should indicate "ABC Corp." except on weekends, holidays, or calls placed to a specific individual(s).

At block 318, at least one caller profile associated with the device identifier is generated. In one embodiment, a single caller profile can be generated that includes the first caller name, the second caller name, and any caller preferences. In another embodiment, a first caller profile can be generated in association with the first caller name and a second caller profile can be generated in association with the second caller name. In such an embodiment, caller-name preferences indicating usage of the first caller name can be included in the first caller profile, and any caller-name preferences indicating usage of the second caller name can be included in the second caller profile. Such a caller profile(s) can, thereafter, be utilized to identify which caller name to provide in connection with a call initiated by a calling device.

FIG. 4 illustrates an exemplary method 400 for providing alternate caller names in accordance with caller-name preferences and is generally depicted by numeral 400. The method 400 is described in the context of the example caller-name provider 108 of FIG. 1 for ease of illustration, but is not limited to being performed in such a context.

Initially, at block 410, a request for caller name is received. At block 412, calling data, including a calling device identifier, associated with a call initiated by a calling device is received. In embodiments, such calling data might indicate the calling-device identifier, a caller (e.g., an account number), a time the call is initiated, a day the call is initiated, an indication of a receiving device intended to receive the call, a location of the calling device, etc. At block 414, the calling device identifier is utilized to reference one or more caller profiles associated with the calling device identifier. As can be appreciated, in other embodiments, appropriate caller profiles can be identified using other information, such as an account number of a user of the calling device.

At block 416, one or more caller-name preferences within the caller profile(s) are used to select or identify a caller name to provide. In this regard, the calling data, such as the time of the call, can be compared to the caller-name preferences to determine which caller-name preference the calling data most corresponds or matches. For instance, a time of the instant call can be compared to a call time preference in a first caller profile associated with a first caller name and a call time preference in a second caller profile associated with a second caller name to determine, for example, that the instant call time falls within a time range designated by the first caller profile. In such a case, the first caller name is selected for this particular call.

At block 418, the selected caller name is provided for presentation to a device intended to receive the phone call. In this regard, the selected caller name can be provided to the terminating network associated with the receiving device such that the terminating network can provide the receiving device with the appropriate caller name, as indicated by the caller-name preferences. As can be appreciated, the selected caller name provided for presentation might be one caller name at a first calling instance and another caller name at a second calling instance in accordance with the caller-name preferences indicated for the particular calling device, calling line, or user associated therewith.

Figure 5:
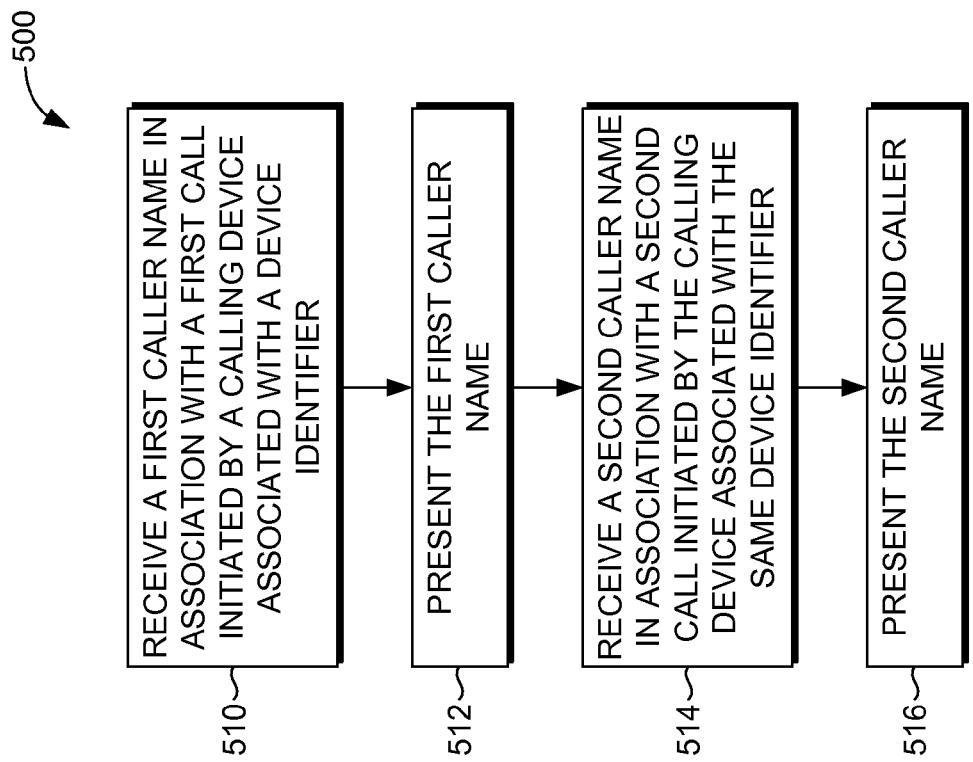
FIG. 5 illustrates a third method for providing alternate names, in accordance with an embodiment of the present invention.

FIG. 5 illustrates an exemplary method 500 for providing alternate caller names in accordance with caller-name preferences and is generally depicted by numeral 500. The method 500 is described in the context of the example receiving device 110 of FIG. 1 for ease of illustration, but is not limited to being performed in such a context.

Initially, at block 510, a first caller name is received in association with a first call initiated by a calling device associated with a device identifier, such as a phone number. Subsequently, at block 512, the first caller name is presented via the receiving device such that a user of the receiving device can recognize the source of the call (e.g., user, entity, etc.). In some embodiments, the first caller name is displayed in conjunction with the device identifier. For example, the caller name can be displayed adjacent to or near the corresponding phone number.

At block 514, a second caller name is received in association with a second call initiated by a calling device associated with the same device identifier (e.g., phone number). Such a second call can be initiated at a time later than the first call (e.g., a different time of day, a different day of the week, etc.) Thereafter, at block 516, the second caller name is presented via the receiving device such that a user of the receiving device can recognize the source of the call. In some embodiments, the second caller name is displayed in conjunction with the device identifier. For example, the caller name can be displayed adjacent to or near the corresponding phone number.

Although method 500 is described in the context of a single receiving device, as can be appreciated, this method can be employed with multiple receiving devices. That is, a first receiving device might receive and present the first caller name, and a second receiving device might receive and present the second caller name. As discussed herein, the first caller name can be different from the second caller name based on various attributes, such as, for example, a time a call was placed, a day a call was placed, a location of the calling device at the time of the call, an originating country of the call, an indication of the device to receive the call, etc.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more non-transitory computer-readable media having computer-executable instructions embodied thereon that, when executed, perform a method for providing alternate caller names in accordance with caller-name preferences, the method comprising:

receiving a first caller name associated with a device identifier for a calling device;

receiving a second caller name associated with the device identifier for the calling device;

receiving at least one caller preference that indicates a preference of usage for at least one of the first caller name or the second caller name, wherein the at least one caller preference indicates a preference of usage for the at least one of the first caller name or the second caller name based on a time of day setting, a day of week setting, a week setting, a month setting, or a combination thereof;

receiving an indication of at least one priority of the at least one caller preference, wherein the at least one priority is used to prioritize the at least one caller preference that conflict with one another; and generating at least one caller profile associated with the device identifier, wherein the at least one caller profile includes the first caller name, the second caller name, the at least one caller preference, and the at least one priority, the at least one caller profile being utilized to identify which of the first caller name or the second caller name to provide to in association with a call initiated by the calling device.

2. The media of claim 1, wherein the device identifier comprises a phone number, an Internet Protocol address, or an account number.

3. The media of claim 1, wherein the first caller name, the second caller name, and the at least one caller preference are provided by the calling device associated with the device identifier.

4. The media of claim 1, wherein the at least one caller profile associated with the device identifier comprises a single caller profile that includes the first caller name, the second caller name, and the at least one caller preference.

5. The media of claim 1, wherein the at least one caller profile associated with the device identifier comprises a first caller profile that includes the first caller name and one or more first caller preferences and a second caller profile that includes the second caller name and one or more second caller preferences.

6. The media of claim 1, wherein the at least one caller profile includes a first caller-name type associated with the first caller name and a second caller-name type associated with the second caller name, the first caller-name type and the second-caller name type describe the type of the corresponding caller name.

7. The media of claim 1, wherein the at least one caller preference indicates a preference for usage based on a time of day setting, a day of week setting, a week setting, a month setting, a device location setting, a receiving-device identifier setting, a holiday setting, an originating country setting, or a combination thereof.

8. The media of claim 1 further comprising providing the at least one caller profile associated with the device identifier to a caller-name provider that provides caller names.

9. One or more non-transitory computer-readable media having computer-executable instructions embodied thereon that, when executed, perform a method for providing alternate caller names in accordance with caller-name preferences, the method comprising:

receiving a device identifier associated with a phone call initiated by a calling device;

referencing one or more caller-name preferences associated with the calling device, the one or more caller-name preferences indicating usage of a first caller name and a second caller name, wherein the one or more caller-name preferences indicates a preference of usage for the first caller name or the second caller name based a physical location of the calling device; and utilizing the one or more caller-name preferences and the physical location of the calling device to select one of the first caller name and the second caller name to provide to in association with the phone call initiated by the calling device.

10. The media of claim 9, wherein the one or more caller-name preferences indicates a preference for usage based on a time of day setting, a day of week setting, a week setting, a month setting, a device location setting, a receiving-device identifier setting, a holiday setting, an originating country setting, or a combination thereof.

11. The media of claim 9 further comprising receiving calling data indicating attributes associated with the phone call initiated by the calling device.

12. The media of claim 11 further comprising utilizing the calling data in accordance with the one or more caller-name preferences to select the one of the first caller name and the second caller name to provide in association with the phone call.

13. The media of claim 12, wherein the calling data indicates a time of day of the phone call, a day of week of the phone call, a location of the calling device, a receiving-device identifier indicating the device or line to receive the phone call, an indication of an originating country of the phone call, or a combination thereof.

14. The media of claim 9, wherein the one or more caller-name preferences associated with the calling device indicating usage of the first caller name and the second caller name are referenced from a caller profile associated with the calling device.

15. The media of claim 9, wherein a first set of caller-name preferences associated with the calling device indicating usage of the first caller name are referenced from a first caller profile associated with the calling device, and a second set of caller-name preferences associated with the calling device indicating usage of the second caller name are referenced from a second caller profile associated with the calling device.

16. The media of claim 9 further comprising receiving a request for a caller name associated with the device identifier.

17. The media of claim 16 further comprising providing the selected caller name to a terminating network that requested the caller name.

18. A method for providing alternate caller names in accordance with caller-name preferences, the method comprising:

in association with a first call initiated by a calling device at a first physical location associated with a phone number, receiving and presenting a first caller name; and in association with a second call initiated at a different location by the calling device at a second physical location associated with the same phone number, receiving and presenting a second caller name that is different from the first caller name, wherein the first caller name and the second caller name are selected based on caller-name preferences indicating a preference of usage for the first caller name and the second caller name, wherein the preference of usage for the first caller name or the second caller name is based on a physical location of the calling device at a time the corresponding call is initiated.

19. The method of claim 18, wherein the first caller name is received and presented on a first receiving device, and the second caller name is received and presented on a second receiving device.

20. The method of claim 18, wherein the first caller name is associated with a name of a user of the calling device, and the second caller name is associated with a business name corresponding with the user of the calling device.

* * * * *